US012593121B2

(12) United States Patent
Li et al.

(10) Patent No.: US 12,593,121 B2
(45) Date of Patent: Mar. 31, 2026

(54) METHOD, APPARATUS, DEVICE AND STORAGE MEDIUM FOR IMAGE PROCESSING

(71) Applicants:Lemon Inc., Grand Cayman (KY); Beijing Zitiao Network Technology Co., Ltd., Beijing (CN)

(72) Inventors: Yongjun Li, Los Angeles, CA (US); Can Jin, Los Angeles, CA (US); Xiaokai Li, Beijing (CN)

(73) Assignees: LEMON INC., Grand Cayman (KY); BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 154 days.

(21) Appl. No.: 18/522,576

(22) Filed: Nov. 29, 2023

(65) Prior Publication Data
US 2024/0179391 A1 May 30, 2024

(30) Foreign Application Priority Data

Nov. 30, 2022 (CN) .......................... 202211527300.6

(51) Int. Cl.
| | |
|---|---|
| *H04N 23/61* | (2023.01) |
| *H04N 23/45* | (2023.01) |
| *H04N 23/73* | (2023.01) |

(52) U.S. Cl.
CPC ............. *H04N 23/61* (2023.01); *H04N 23/45* (2023.01); *H04N 23/73* (2023.01)

(58) Field of Classification Search
CPC ........ H04N 23/61; H04N 23/45; H04N 23/80; H04N 23/73; G06F 3/013
See application file for complete search history.

(56) References Cited

U.S. PATENT DOCUMENTS

| | | |
|---|---|---|
| 2016/0044256 A1 | 2/2016 | Yin et al. |
| 2020/0236314 A1 | 7/2020 | Aoyama |
| 2021/0096225 A1* | 4/2021 | Subasingha ............. G01S 17/10 |
| 2022/0246663 A1* | 8/2022 | Kobayashi ........... H04N 23/617 |
| 2022/0343472 A1* | 10/2022 | Ollila ...................... G06F 3/013 |

FOREIGN PATENT DOCUMENTS

| | | | | |
|---|---|---|---|---|
| CN | 111066315 B | * | 7/2021 | ............. H04N 23/63 |
| CN | 114270799 A | | 4/2022 | |

* cited by examiner

*Primary Examiner* — Lin Ye
*Assistant Examiner* — Steven Daniel Barry
(74) *Attorney, Agent, or Firm* — Astute IP Law Group

(57) ABSTRACT

According to embodiments of the disclosure, a method, apparatus, device, and storage medium for image processing are provided. In this method, an image sensing unit array of a camera is divided into a set of full processing units and at least one set of partial processing units based on a characteristic of a lens of the camera, and/or a current gazing point of a user of the camera. Within at least one stage of a plurality of stages of an imaging process using the camera, a processing load associated with at least some units of the partial processing units is reduced.

18 Claims, 7 Drawing Sheets

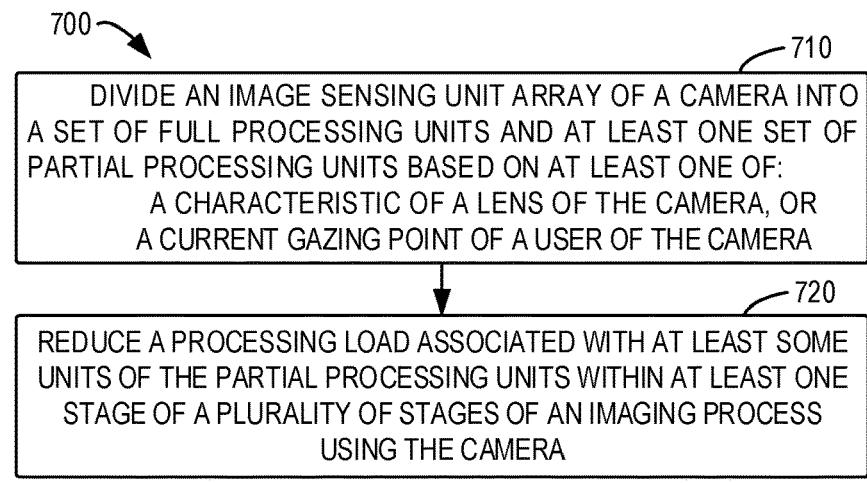

700

710

DIVIDE AN IMAGE SENSING UNIT ARRAY OF A CAMERA INTO A SET OF FULL PROCESSING UNITS AND AT LEAST ONE SET OF PARTIAL PROCESSING UNITS BASED ON AT LEAST ONE OF:
A CHARACTERISTIC OF A LENS OF THE CAMERA, OR
A CURRENT GAZING POINT OF A USER OF THE CAMERA

720

REDUCE A PROCESSING LOAD ASSOCIATED WITH AT LEAST SOME UNITS OF THE PARTIAL PROCESSING UNITS WITHIN AT LEAST ONE STAGE OF A PLURALITY OF STAGES OF AN IMAGING PROCESS USING THE CAMERA

FIG. 7

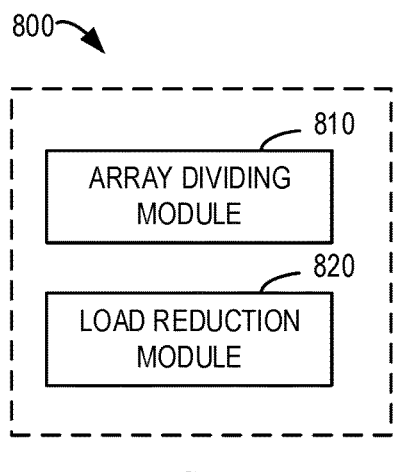

800

810

ARRAY DIVIDING MODULE

820

LOAD REDUCTION MODULE

FIG. 8

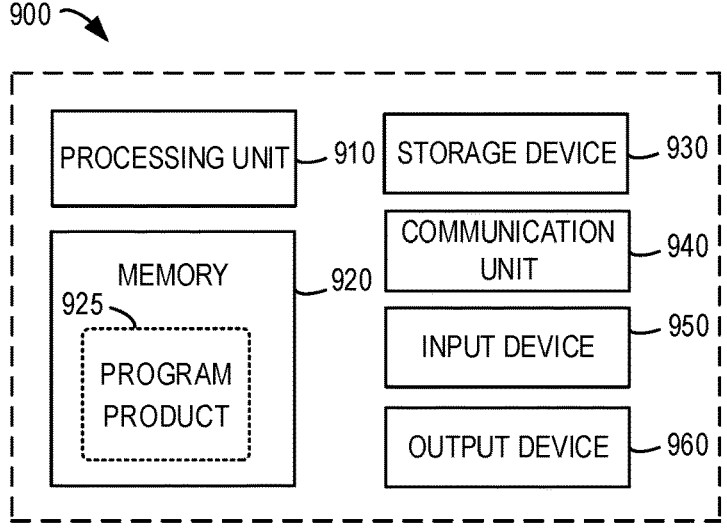

900

PROCESSING UNIT — 910

STORAGE DEVICE — 930

MEMORY — 920

COMMUNICATION UNIT — 940

925

PROGRAM PRODUCT

INPUT DEVICE — 950

OUTPUT DEVICE — 960

FIG. 9

METHOD, APPARATUS, DEVICE AND STORAGE MEDIUM FOR IMAGE PROCESSING

CROSS REFERENCE

The present application claims priority to Chinese Patent Application No. 202211527300.6, filed on Nov. 30, 2022, and entitled "method, apparatus, device and storage medium for image processing", the entirety of which is incorporated herein by reference.

FIELD

Example embodiments of the present disclosure generally relate to a field of computer, and more particularly to a method, an apparatus, a device and computer readable storage medium for image processing.

BACKGROUND

In recent years, technologies such as virtual reality (VR), augmented reality (AR), and mixed reality (MR) have been widely developed and applied. In some application scenarios of these technologies, it is necessary to utilize cameras to capture real-world images and present the captured images to users. The real-world images can be presented to the users together with computer-generated virtual images. For example, Video See Through (VST) can achieve such functions.

SUMMARY

In a first aspect of the present disclosure, a method of image processing is provided. The method includes: dividing an image sensing unit array of a camera into a set of full processing units and at least one set of partial processing units based on at least one of: a characteristic of a lens of the camera, or a current gazing point of a user of the camera; and reducing a processing load associated with at least some units of the partial processing units within at least one stage of a plurality of stages of an imaging process using the camera.

In a second aspect of the present disclosure, an apparatus for image processing is provided. The apparatus includes: an array dividing module configured to divide an image sensing unit array of a camera into a set of full processing units and at least one set of partial processing units based on at least one of: a characteristic of a lens of the camera, or a current gazing point of a user of the camera; and a load reduction module configured to reduce a processing load associated with at least some units of the partial processing units within at least one stage of a plurality of stages of an imaging process using the camera.

In a third aspect of the present disclosure, an electronic device is provided. The device includes: at least one processing unit; and at least one memory, coupled to the at least one processing unit and storing instructions for execution by the at least one processing unit, the instructions, when executed by the at least one processing unit, causing the electronic device to perform the method of the first aspect.

In a fourth aspect of the present disclosure, a computer-readable storage medium is provided. The computer-readable storage medium stores a computer program that can be executed by a processor to implement the method of the first aspect.

It would be appreciated that the content described in the Summary section of the present invention is neither intended to identify key or essential features of the implementations of the present disclosure, nor is it intended to limit the scope of the present disclosure. Other features of the present disclosure will be readily envisaged through the following description.

BRIEF DESCRIPTION OF THE DRA WINGS

In conjunction with the accompanying drawings and with reference to the following detailed description, the above and other features, advantages and aspects of the various embodiments of the present disclosure will become more apparent.

FIG. 7 illustrates a flowchart of a process for image processing according to some embodiments of the present disclosure;

FIG. 8 illustrates a block diagram of an apparatus for image processing according to some embodiments of the present disclosure; and FIG. 9 illustrates a block diagram of a device in which a plurality of embodiments of the present disclosure may be implemented.

DETAILED DESCRIPTION

Figure 1:
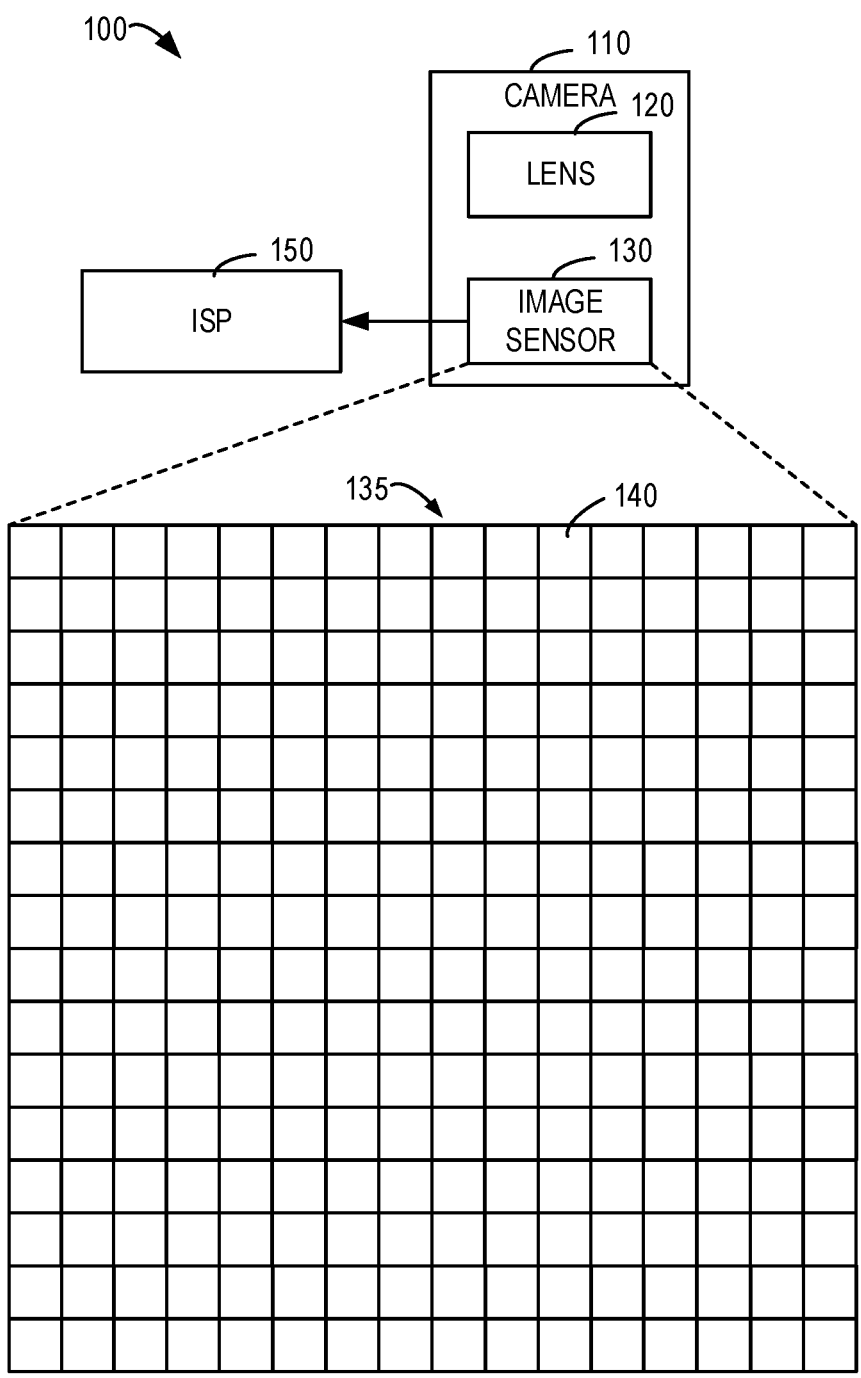
FIG. 1 illustrates a schematic diagram of an example imaging system in which embodiments of the present disclosure may be implemented.

It is to be understood that, before applying the technical solutions disclosed in various implementations of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

It is to be understood that data involved in the present technical solution (including but not limited to the data itself, the acquisition or use of the data) should comply with requirements of corresponding laws and regulations and relevant rules.

The embodiments of the present disclosure will be described in more detail below with reference to the accompanying drawings. Although some implementations of the present disclosure are shown in the drawings, it would be appreciated that the present disclosure can be implemented in various forms and should not be interpreted as limited to the implementations described herein. On the contrary, these implementations are provided for a more thorough and complete understanding of the present disclosure. It would be appreciated that the drawings and implementations of the present disclosure are only for illustrative purposes and are not intended to limit the scope of protection of the present disclosure.

It should be noted that the titles of any section/sub-section provided in this article are not restrictive. Various embodiments are described throughout this article, and any type of embodiment can be included under any section/sub-section. In addition, the embodiments described in any section/sub-section can be combined in any way with any other embodiments described in the same section/sub-section and/or different sections/sub-sections.

In the description of the embodiments of the present disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". The following may also include other explicit and implicit definitions. The terms "first", "second", etc. may refer to different or identical objects. The following may also include other explicit and implicit definitions.

Example Imaging System

FIG. 1 illustrates a schematic diagram of an example imaging system 100 in which embodiments of the present disclosure may be implemented. The imaging system 100 includes a camera 110, which further includes a lens 120 and an image sensor 130. A light passing through the lens 120 is projected onto the photosensitive surface of the image sensor 130. The image sensor 130 converts a light signal on the photosensitive surface into an electrical signal using a photoelectric conversion function, thereby obtaining raw data of an image (e.g., a still image or a frame of a video). For this purpose, the image sensor 130 includes an image sensing unit array 135, also referred to simply as a sensing unit array 135 or an array 135.

The sensing unit array 135 includes a plurality of imaging units (also referred to as "units") 140 arranged in rows and columns, such as Complementary Metal Oxide Semiconductor (CMOS) transistors. In the imaging process, the units 140 are exposed. Generally, each unit 140 corresponds to one pixel of the image. Therefore, the array 135 may also be referred to as a pixel array. It should be understood that the number and arrangement of imaging units shown in FIG. 1 are merely exemplary and are not intended to limit the scope of the present disclosure. In the embodiments of the present disclosure, there may be any suitable number of imaging units arranged in any suitable pattern.

In addition to the imaging unit array 135, the image sensor 130 further includes other parts. For example, the image sensor 130 may further include a module for controlling exposure and data readout of each unit, an analog signal processing module, and an analog-to-digital conversion module, etc. After exposure, reading, analog signal processing, and analog-to-digital conversion, the raw data of the image may be obtained.

The raw data captured by the image sensor 130 is usually not directly presented as an image to human eyes. To this end, the imaging system 100 further includes an Image Signal Processor (ISP) 150. The ISP 150 is configured to perform image signal processing on the image sensor 130. Examples of image signal processing may include, but are not limited to, black level correction, lens shadow correction, dead pixel correction, demosaic (i.e., color interpolation), and the like.

The imaging process using the camera 110 includes a plurality of stages. For example, these stages may include exposure of the sensing unit array 135, also referred to as an exposure stage. By exposure, the unit 140 converts the light signal into the electrical signal as exposure data. These stages may further include scanning of the sensing unit array 135, also referred to as a scanning stage. In this stage, a unit desired to be operated on is selected by a row selection circuit and column selection circuit, and the electrical signal on the unit is read out. These stages may also include a transmission of data captured by the sensing unit array 135 (which is the raw data after analog-to-digital conversion), also referred to as a transmission stage. In the transmission stage, the data captured by the sensing unit array 135 is transmitted from the image sensor 130 to the ISP 150. These stages may also include image signal processing of the data captured by the sensing unit array 135, also referred to as a signal processing stage. In this stage, the ISP 150 performs image signal processing on the raw data of the image sensor 135, such as demosaic, black level correction, etc.

The imaging system 100 may be implemented in any suitable device. In some embodiments, the imaging system 100 may be included in a VR device, AR device, or MR device. For example, the imaging system 100 may be configured to implement VST, and accordingly, the camera 110 may be a VST camera.

It should be understood that the structure and function of the imaging system 100 are described for exemplary purposes only and not to imply any limitation as to the scope of the present disclosure. The imaging system 100 may also include other modules not shown. In addition, although the ISP 150 is shown separately from the camera 110, this is merely exemplary. In some embodiments, the ISP 150 may be included in the camera 110.

As mentioned briefly earlier, in some scenarios such as VST, it is necessary to utilize a camera to capture real-world images and present the captured images to the user. On the other hand, in some AR, VR, and MR applications, high resolution (such as 16 million pixels) and/or high frame rates (such as 120 frames per second fps) are required. This places high demands on the processing capabilities of the imaging system.

A solution of image processing is provided according to the embodiments of the present disclosure. In an imaging process using a camera, an image sensing unit array of a camera is divided into a set of full processing units and at least one set of partial processing units based on a characteristic of a lens of the camera and/or a current gazing point of a user of the camera. Within at least one stage of an imaging process using the camera, a processing load associated with at least some units of the partial processing units is reduced.

It will be more clearly understood from the following description that according to the embodiments of the present disclosure, important and relatively unimportant imaging units for visual effects are first distinguished, but different levels of processing are performed on these two imaging units. Specifically, degradation processing is performed on unimportant imaging units. In this way, the processing load of imaging can be reduced without reducing user experience, such as reducing transmission bandwidth or power consumption of imaging. When applied to AR, VR, or MR devices, it is beneficial to achieve low-power devices. In addition, according to the embodiments of the present disclosure, the structure and number of sensing unit arrays have not been changed. Therefore, in some cases (such as when power consumption is insensitive), an original processing mode of each unit may be maintained to keep an original resolution.

The following will continue with reference to FIG. 1 and other accompanying drawings describe some example embodiments of the present disclosure.

Dividing of Sensing Units

The characteristics of the lens 120 of the camera 110 (e.g., focal length, angle of field of view, etc.) may cause the obtained image with a distortion in some parts to be greater than the distortion in other parts. Therefore, in some embodiments, the sensing unit array 135 may be divided into the full processing units and the partial processing units based on the characteristics of the lens 120 of the camera 110. For example, sensing units corresponding to image parts without distortion or with small distortion may be divided into the full processing units, and sensing units corresponding to image parts with relatively large distortion may be divided into the partial processing units.

Figure 2:
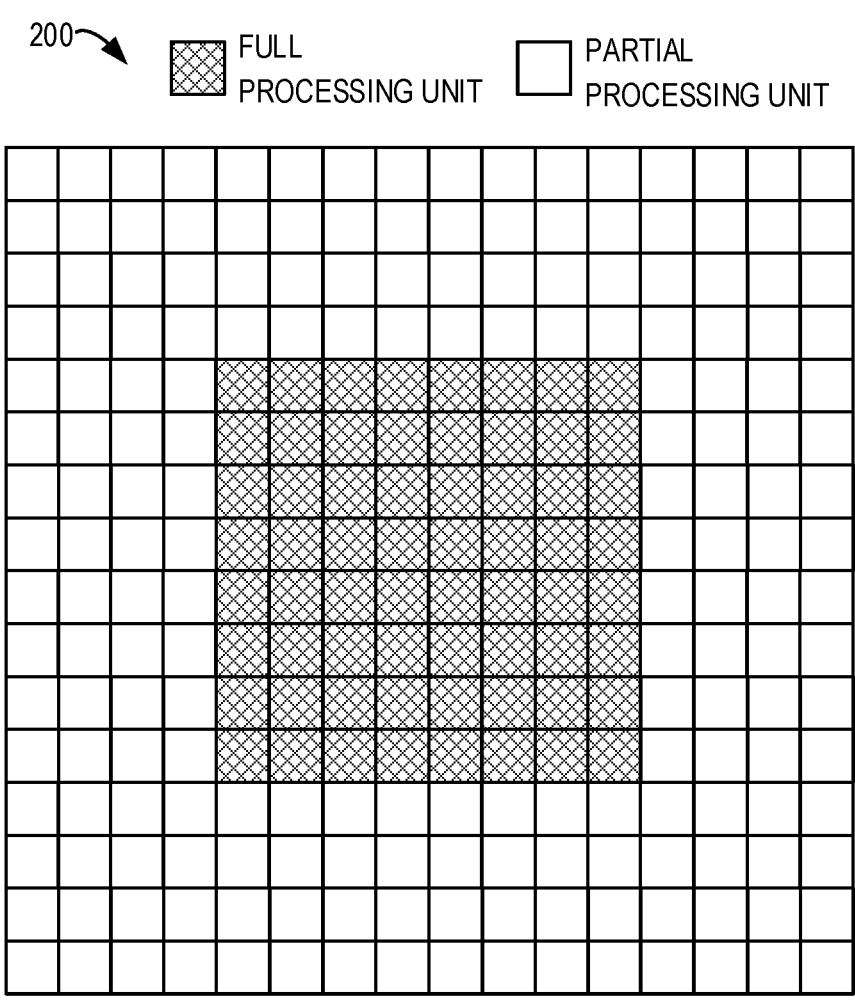
FIG. 2 illustrates a schematic diagram of an example of dividing an image sensing unit array according to some embodiments of the present disclosure.

FIG. 2 illustrates a schematic diagram of an example of dividing an image sensing unit array 200 according to some embodiments of the present disclosure. The array 200 may be regarded as an example of the array 135. As an example, a degree of distortion corresponding to each imaging unit of the array 200 may be determined based on a distortion coefficient of the lens 120. Imaging units with a distortion degree less than a threshold degree are determined as the full processing units, and imaging units with a distortion degree greater than a threshold degree are determined as the partial processing units. In the example of FIG. 2, based on the characteristics of the lens 120, units located in a central region of the array 200 are divided into the full processing units, and units in a region close to an edge of the array 200 are divided into the partial processing units.

In such an embodiment, imaging units with larger distortions will be degraded, while imaging units with smaller distortions will not be degraded. In this way, the user's visual experience will not be affected. In addition, the relative position and orientation of the lens 120 and the imaging unit array 135 are generally fixed. Therefore, dividing the sensing unit array based on the characteristics of the lens is generally fixed.

Human eyesight is divided into two parts: foveated eyesight and peripheral eyesight. The foveated eyesight is used to provide precise and detailed visual content, while the peripheral eyesight is a wide-angle view of picture. At the same time, a gazing point of the user affects which part of the image the user will use the foveated eyesight to view. Therefore, the gazing point of the user of the camera 110 is important.

To this end, in some embodiments, the sensing unit array 135 may be divided into the full processing units and the partial processing units based on the current gazing point of the user. For example, obtaining a center position of the current gazing point relative to the imaging unit array 135, imaging units within a certain range from the center position are divided into the full processing units, and other imaging units are divided into the partial processing units.

Figure 3A:
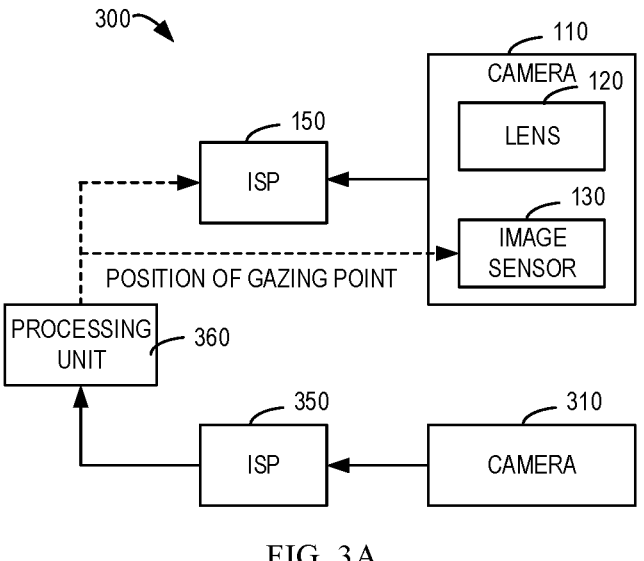
FIG. 3A illustrates a schematic diagram of another example imaging system in which some embodiments of the present disclosure may be implemented.

Further, considering that the gazing point of the user is dynamically changing, it is necessary to obtain a real-time position of the gazing point. In some embodiments, the imaging system may include a further camera (e.g., eye trackers) for determining the gazing point of the user in real time. An imaging system 300 shown in FIG. 3A may be an example of the imaging system 100. Compared with the imaging system 100, the imaging system 300 additionally includes a camera 310, an ISP 350, and a processing unit 360.

The camera 310 is configured to capture the raw data for imaging the user's eyes. Therefore, the camera 310 may be regarded as an Eye Tracking (ET) camera. The ISP 350 performs image signal processing on the captured raw data by ET camera to generate an image of the user's eyes. The processing unit 360 may be, for example, a Central Processing Unit (CPU) or a Neural network Processing Unit (NPU). Based on the image of the user's eyes, the processing unit 360 determines the relative position of the current gazing point of the user to the sensing unit array 135, which is also referred to as a position of the gazing point. For example, the position of the gazing point may be represented as a coordinate of the gazing point in the sensing unit array 135.

Depending on which stage of the imaging process the degradation processing of the partial processing units occurs, the processing unit 360 provides a derived position of the gazing point to at least one of the ISP 150 and the image sensor 130. For example, if the degradation processing occurs during the signal processing stage, the position of the gazing point is provided to the ISP 150. For another example, if the degradation processing occurs during the exposure stage or the scanning stage, the position of the gazing point is provided to the image sensor 130. For a further example, if the degradation occurs during the transmission stage, the position of the gazing point may be provided to the ISP 150 and the image sensor 130. Based on the obtained position of the gazing point, the ISP 150 and/or the image sensor 130 determine the full processing units and partial processing units, thereby the degradation processing of the partial processing units is achieved.

In such an embodiment, the imaging process requires the use of the derived position of the gazing point, and determining the position of the gazing point using the camera 310, ISP 350 and processing unit 360 requires processing time. In some embodiments, the timing of the gazing point processing and imaging processing may be further controlled so that the imaging processing cycle begins after the gazing point processing cycle. In particular, in the case where the imaging system 100 is used for video, such timing control is required between different frames of the video require.

Figure 3B:
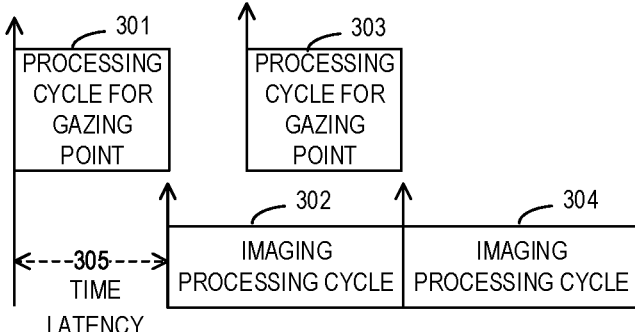
FIG. 3B illustrates a timing relationship between gazing point processing and imaging processing according to some embodiments of the present disclosure.

FIG. 3B illustrates a timing relationship between the gazing point processing and the imaging processing according to some embodiments of the present disclosure. As shown in FIG. 3B, a processing cycle of the current frame includes the gazing point processing cycle 301 and the imaging processing cycle 302. Similarly, the processing cycle of the next frame includes the gazing point processing cycle 303 and the imaging processing cycle 304. The imaging processing cycle may include various stages of the imaging process described with reference to FIG. 1.

Obtaining the position of the gazing point introduces a time latency 305. Accordingly, the imaging process may be initialed based on the time latency 305 so that at least the stage in which partial processing units are degraded occurs after the time latency 305. For example, the entire imaging processing cycle may be located after the time latency 305, as shown in FIG. 3B. For another example, if the degradation processing occurs during the signal processing stage, the signal processing stage may occur after the time latency 305, while the exposure stage, scanning stage, and transmission stage may occur before the time latency 305.

In such an embodiment, the gazing point processing time may be shortened as much as possible, so that the imaging process may be obtained the position of the gazing point with the smallest possible time latency. Further, the imaging camera (e.g., the camera 110) synchronization and the ET camera (e.g., the camera 310) synchronization may be phase shifted to eliminate the time latency.

The current gazing point of the user may be dynamically determined by methods such as those described above. The sensing unit array 135 may be divided into the full processing units and the partial processing units based on the position of the current gazing point. In some embodiments, sensing units within a certain range from the position of the gazing point may be determined as the full processing units, and sensing units beyond this range from the position of the gazing point may be determined as the partial processing units.

In some embodiments, an eyesight characteristic of human eyes may be further taken into consideration. Specifically, the sensing unit array may be divided into the full processing units and the partial processing units based on the position of the gazing point and the characteristic of decay of the eyesight from the gazing point. Sensing units in a region where the eyesight is greater than a threshold may be divided into the full processing units, while sensing units in the region where the eyesight is less than the threshold may be divided into the partial processing units. The eyesight may be represented by any suitable metric or parameter. For example, in VR, AR, or MR scenes, Pixels Per Degree (PPD) may be used to represent the eyesight.

Figure 4:
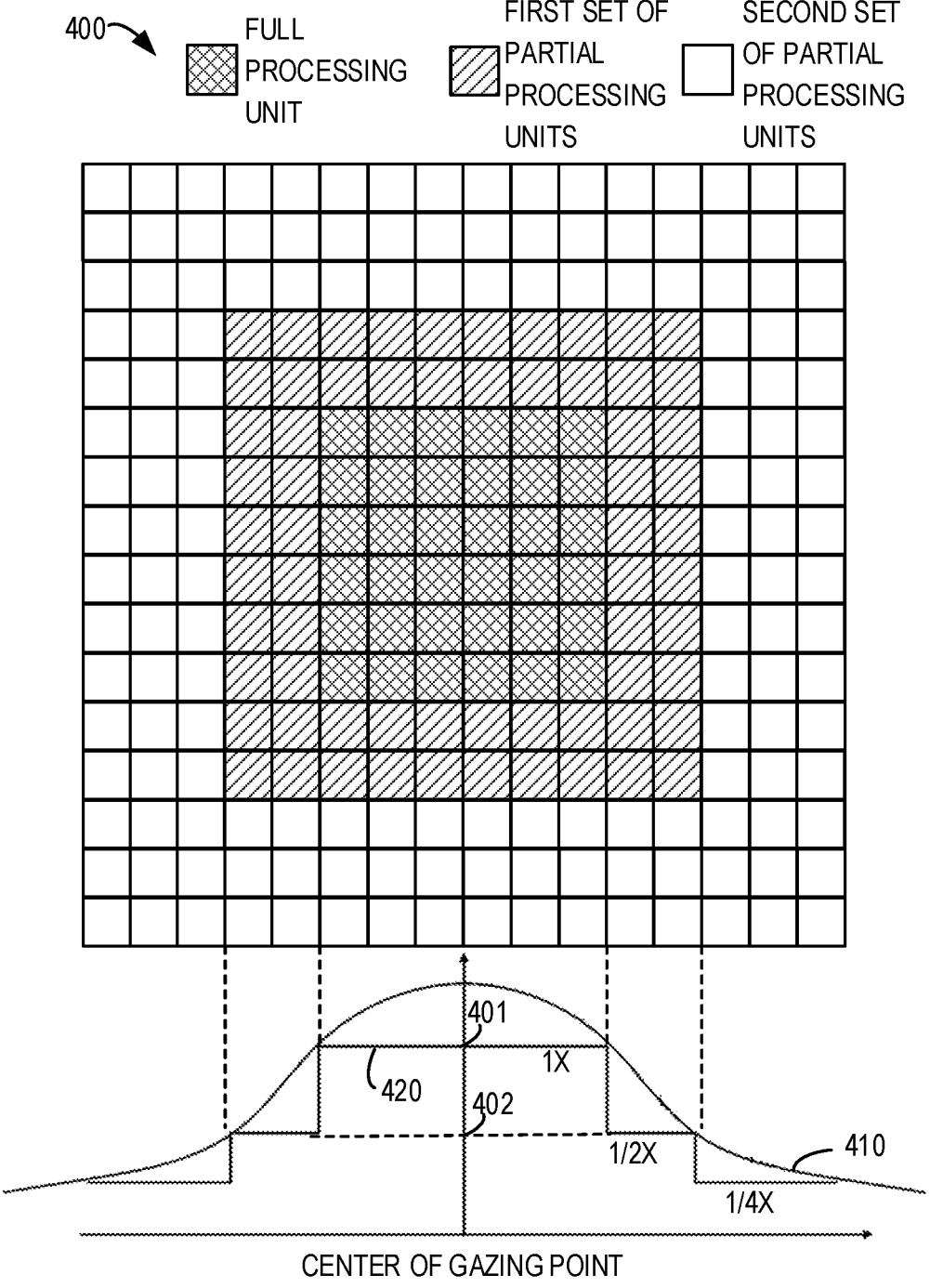
FIG. 4 illustrates a schematic diagram of another example of dividing an image sensing unit array according to some embodiments of the present disclosure.

FIG. 4 illustrates a schematic diagram of dividing an image sensing unit array 400 based on the gazing point according to some embodiments of the present disclosure. The sensing unit array 400 may be regarded as an example of the sensing unit array 135. In this example, the center of the gazing point corresponds to a center of the sensing unit array 400. An attenuation curve 410 represents the characteristic of decay of an eyesight from the gazing point. Sensing units in the region where the eyesight is greater than a first threshold 401 are divided into the full processing units. Sensing units in the region where the eyesight is less than a first threshold 402 are divided into the partial processing units. Further, as shown in FIG. 4, based on the second threshold 402, the partial processing units may be divided into a first set of partial processing units and a second set of partial processing units.

A polyline 420 represents this partitioning of the sensing unit array 400. Normal processing is performed on the full processing units. Different levels of degradation processing may be performed on the first set of partial processing units and the second set of partial processing units. Processing of the second set of partial processing units is degraded more than that of the first set of partial processing units. For example, the resolution of the image part corresponding to the full processing units remains the original resolution, the resolution of the image part corresponding to the first set of partial processing units is degraded to half of the original resolution, and the resolution of the image part corresponding to the second set of partial processing units is degraded to one-fourth of the original resolution.

The above-described example embodiments of dividing sensing units based on the characteristics of the lens and the gazing point of the user respectively. In some embodiments, the characteristics of the lens and the gazing point of the user may be combined. For example, sensing units with smaller distortion and close to the center of the gazing point may be divided into the full processing units, and the remaining sensing units may be divided into the partial processing units.

In the examples of FIGS. 2 and 4, sensing units close to the center of the sensing unit array are divided into the full processing units, but this is merely exemplary and not intended to limit the scope of the present disclosure. In embodiments of the present disclosure, depending on the characteristics of the lens and/or the current gazing point of the user, the full processing units may be located at any suitable position in the sensing unit array.

Degradation Processing of Partial Processing Units

The following describes an example of degradation processing of the partial processing units. In some embodiments, each partial processing unit may be exposed to generate electrical signals as captured data. The captured data of at least two adjacent units may then be combined to generate combined data, which may be used as an exposure result for subsequent processing. In such an embodiment, each unit in the array is exposed, so the image sensor may be fully utilized. In addition, the combined partial processing units have a Signal to Noise Ratio (SNR) higher than the full processing units.

Furthermore, in some embodiments, the data of which adjacent units is combined may depend on a positional relationship of the partial processing units relative to the full processing units. Specifically, for each set of partial processing units, the number of adjacent units related to the positional relationship is selected from the set of partial processing units for data combining based on the positional relationship of the set of partial processing units relative to the set of full processing units.

Figure 5:
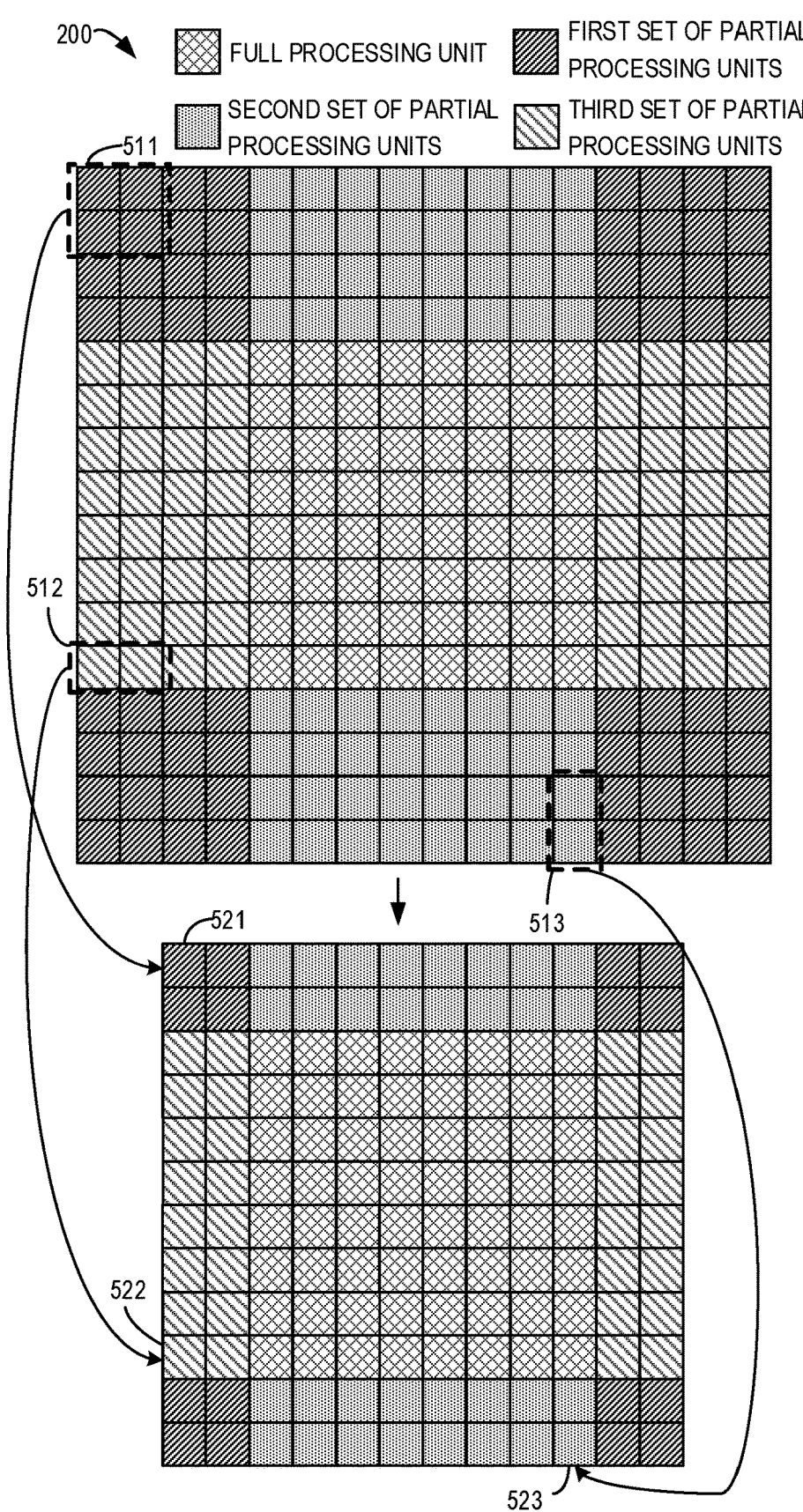
FIG. 5 illustrates a schematic diagram of an example of combining partial processing units according to some embodiments of the present disclosure.

FIG. 5 illustrates a schematic diagram of an example of combining partial processing units according to some embodiments of the present disclosure. Comparing FIG. 5 with FIG. 2, the partial processing units in the array 200 are further divided into a first, a second, and a third sets of partial processing units. As shown in FIG. 5, the first set of partial processing units is in a diagonal relationship with the full processing units. Correspondingly, in the first set of partial processing units, data captured by m adjacent units is combined, where m is a multiple of 4, in this example 4. The combined data is regarded as data of one sensing unit. For example, data captured by four adjacent units in a dashed box 511 is combined as data captured by a unit 521 after combined.

The second set of partial processing units and full processing units are in a parallel relationship in a first direction of the image (e.g., a height direction of the image). Accordingly, in the second set of partial processing units, data captured by m/2 units adjacent in the first direction is combined. The combined data is regarded as data of one sensing unit. For example, data captured by two adjacent units in a dashed box 513 is combined as data captured by a unit 523 after combined.

Similarly, the third set of partial processing units and the full processing units are in a parallel relationship in a second direction of the image (e.g., a width direction of the image). Accordingly, in the third set of partial processing units, data captured by m/2 units adjacent in the second direction is combined. The combined data is regarded as data of one sensing unit. For example, data captured by two adjacent units in a dashed box 512 is combined as data captured by a unit 522 after combined.

In the example of FIG. 5, it may be regarded as ¼ down-sampling of the first set of partial processing units and ½ down-sampling of the second and third sets of partial processing units. In this example, m is 4, but this is merely exemplary and is not intended to limit the scope of the disclosure. Depending on the desired level of degradation processing, m may be any suitable multiple of 4, such as 8, 16, etc.

Data may be combined in any suitable way. For example, an average or a weighted average of data captured by adjacent units may be used as the combined data. A Weighted weight may depend on a distance between units and the full processing units. For example, units closer to the full processing units may have greater weights.

In such an embodiment, adjacent units are selected for data combining depending on the relative position of the partial processing units to the full processing units. In this way, the final generated image may be kept in a regular shape.

In some embodiments, the data combining described above may be performed by the image sensor 130. For example, after reading the electrical signals of adjacent units to be combined, the read electrical signals may be combined and the combined data stored in a register. This may reduce the power consumption of the register. As another example, the data combining may be performed during analog signal processing process or during analog-to-digital conversion process. By implementing data combining at the image sensor 130, not only may the processing power consumption of the image sensor and the ISP be reduced, but also the amount of data transmission between the image sensor and the ISP may be saved.

In some embodiments, the combined data described above may be performed by the ISP 150. For example, data combining may be performed by a module in the ISP 150 for demosaic. In such an embodiment, the processing power consumption of the ISP may be reduced.

The above describes embodiments of data combining of adjacent units in the partial processing units. In some embodiments, to implement degradation processing, exposure of at least some units in the partial processing units may be prevented. For example, in the exposure stage, these units may not be made photosensitive. In this embodiment, since the processing of these units is reduced from the initial exposure stage, the processing load of the subsequent image sensor, the transmission load between the image sensor and the ISP, and the processing load of the ISP may be greatly reduced. In this way, the power consumption of the imaging process may be minimized maximally.

Alternatively or additionally, data captured by the at least some units in the partial processing units may be discarded. In some embodiments, such data discarding may occur at the image sensor 130. For example, during the scanning stage, row selection logic and/or column selection logic may be used to control these units from being gated, so that the electrical signals captured by these units will not be read out. For another example, analog signal processing may not be performed on the electrical signals of these units, or analog-to-digital conversion may not be performed on the electrical signals of these units. By discarding the data at the image sensor 130, the processing power consumption of the image sensor 130, the transmission power consumption between the image sensor and the ISP, and the processing power consumption of the ISP may be reduced.

In some embodiments, the data discarding may occur at the ISP 150. For example, in one or more image signal processing modules, the data corresponding to these units may not be processed.

Hereinafter, units that are not exposed or data is discarded are referred to as target units for ease of description. The following describes an example embodiment of determining a target unit. In some embodiments, the target unit may be randomly selected from the partial processing units.

In some embodiments, the selection of the target unit from the partial processing units may depend on the positional relationship of the partial processing units with respect to the full processing units. Specifically, for each set of partial processing units, a proportion of units related to the positional relationship from the set of partial processing units is selected as target units that are prevented exposure or data is discarded.

Figure 6:
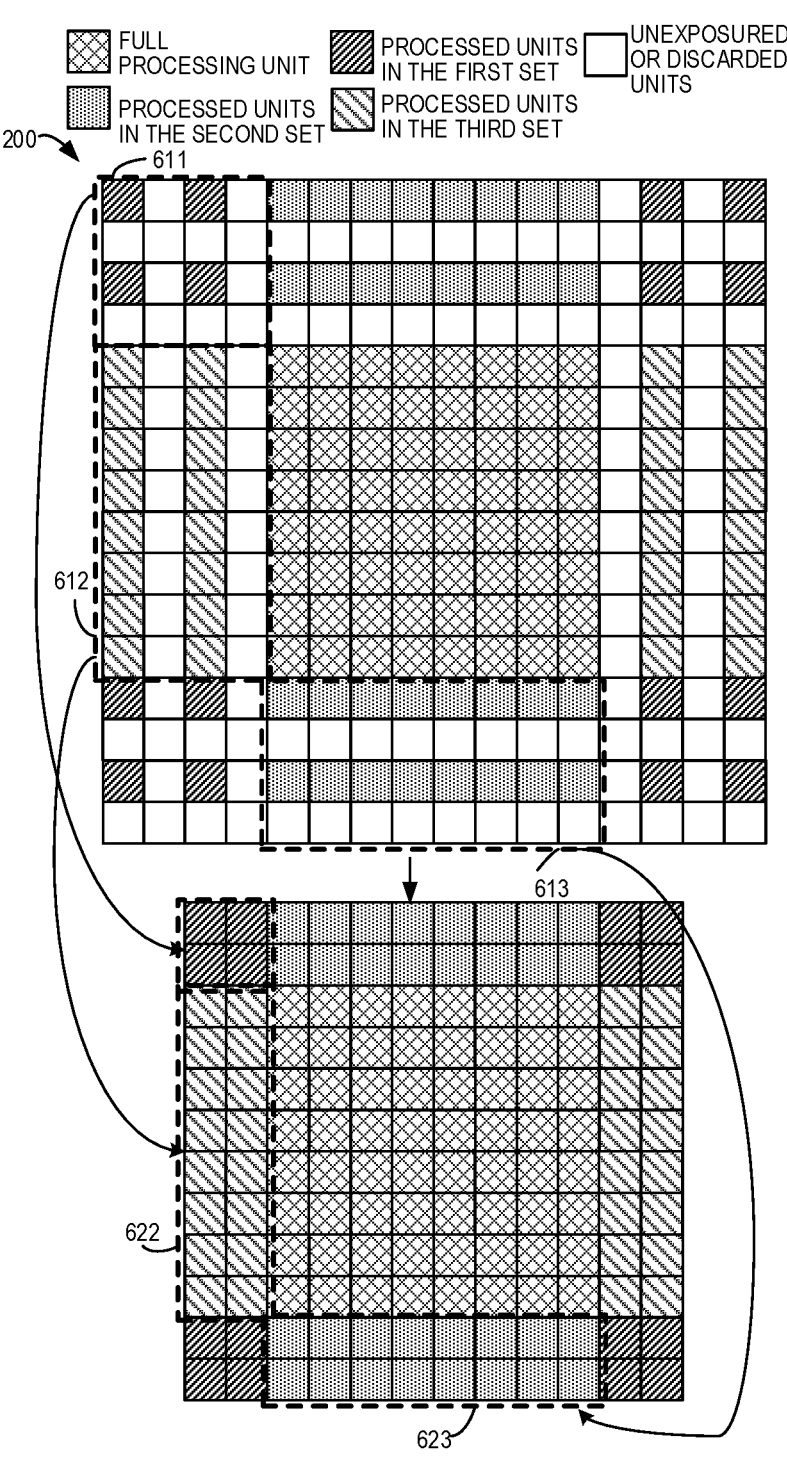
FIG. 6 illustrates a schematic diagram of an example of selecting some partial processing units for processing according to some embodiments of the present disclosure.

FIG. 6 illustrates a schematic diagram of an example of selecting target units according to some embodiments of the present disclosure. Comparing FIG. 6 with FIG. 2, the partial processing units in the array 200 are divided into a first, a second, and a third sets of partial processing units, similar to FIG. 5. As shown in FIG. 6, the first set of partial processing units is in a diagonal relationship with the full processing units. Accordingly, in the first set of partial processing units, 1/n proportion of units are processed, and additional (n−1)/n proportion of units are selected as target units, where n is a multiple of 4, in this example 4. For example, a dashed box 611 includes 16 units, 4 of which are processed, and the remaining 12 units are selected as target units.

The second set of partial processing units and full processing units are in a parallel relationship in a first direction of the image (e.g., a height direction of the image). Accordingly, in the second set of partial processing units, a 2/n proportion of units in the first direction is processed, and other (n−2)/n proportion of units is selected as target units. For example, a dashed box 613 includes 32 units, 16 of which are processed, and the remaining 12 units are selected as target units.

Similarly, the third set of partial processing units and full processing units are in a parallel relationship in a second direction of the image (e.g., a width direction of the image). Accordingly, in the third set of partial processing units, 2/n proportion of units in the second direction are processed, and additional (n−2)/n proportion of units are selected as target units. For example, a dashed box 611 includes 32 units, 16 of which are processed, and the remaining 12 units are selected as target units.

In the example of FIG. 6, it may be regarded that the first set of partial processing units is sampled at a ¼ proportion, and the second and third sets of partial processing units are sampled at a ½ proportion. In this example, n is 4, but this is merely exemplary and not intended to limit the scope of the disclosure. Depending on the desired level of reduced processing, n may be any suitable multiple of 4, such as 8, 16, etc.

In this embodiment, unexposed or data discarded units are selected depending on the relative position of partial processing units to full processing units. In this way, the final generated image may be kept in a regular shape.

Data combining, exposure preventing, and data discarding have been described above as examples of degradation processing, respectively. It should be understood that in some embodiments, data combining, exposure preventing, and data discarding may be combined. For example, data combining may be performed for a set of partial processing units, exposure preventing may be performed for another set of partial processing units, and data discarding may be performed for other sets of partial processing units. However, this is only an example, and any combination of these three-degradation processing is acceptable.

Example Process

FIG. 7 illustrates a flowchart of a process 700 for image processing according to some embodiments of the present disclosure. The process 700 may be implemented at the imaging system 100. The process 700 is described below with reference to FIG. 1.

At block 710, based on a characteristic of a lens of the camera 110 or a current gazing point of a user of the camera 110, an image sensing unit array 135 of a camera 110 is divided into a set of full processing units and at least one set of partial processing units.

In some embodiments, to divide the sensing unit array, a relative position of the gazing point to the image sensing unit array 135 may be determined based on an image captured by a further camera of the user. The image sensing unit array 135 may be divided into a set of full processing units and at least one set of partial processing units based on the relative position and a characteristic of decay of an eyesight from the gazing point.

In some embodiments, a time latency associated with obtaining the relative position may be determined. At least one stage of the imaging process may be initiated based on the time latency.

In some embodiments, to divide the sensing unit array, based on a distortion characteristic of the lens 120, a first region with a distortion less than a threshold distortion and a second region with a distortion greater than the threshold distortion is determined in the image sensing unit array 135.

At block 720, a processing load associated with at least some units of the partial processing units is reduced within at least one stage of a plurality of stages of an imaging process using the camera.

In some embodiments, the plurality of stages of the imaging process comprise: exposure of the image sensing unit array, scanning of the image sensing unit array, transmission of data captured by the image sensing unit array, image signal processing of data captured by the image sensing unit array.

In some embodiments, to reduce the processing load associated with at least some units of the partial processing units, data captured by the respective partial processing units may be obtained. Data captured by at least two adjacent units in the partial processing units may be combined to generate combined data, wherein the combined data is used as an exposure result of the partial processing units for subsequent processing.

In some embodiments, the at least two adjacent units may be determined by: for each set of partial processing units of the at least one set of partial processing units, selecting, based on a positional relationship of the set of partial processing units relative to the set of full processing units, the number of adjacent units related to the positional relationship from the set of partial processing units.

In some embodiments, to reduce the processing load associated with at least some units of the partial processing units, exposure of the at least some units may be prevented, or data captured by the at least some units may be discarded.

In some embodiments, the at least some units are determined by: for each set of partial processing units of the at least one set of partial processing units, selecting, based on a positional relationship of the set of partial processing units relative to the set of full processing units, a proportion of units related to the positional relationship from the set of partial processing units.

Example Apparatus and Equipment

FIG. 8 illustrates a schematic structural block diagram of an apparatus 800 for image processing according to some embodiments of the present disclosure. The apparatus 800 may be implemented or included in the imaging system 100. The various modules/components in the apparatus 800 may be implemented by hardware, software, firmware, or any combination thereof.

As shown, the apparatus 800 includes an array dividing module 810 configured to divide an image sensing unit array of a camera into a set of full processing units and at least one set of partial processing units based on at least one of a characteristic of a lens of the camera or a current gazing point of a user of the camera. The apparatus 800 further includes a load reduction module 820 configured to reduce a processing load associated with at least some units of the partial processing units within at least one stage of a plurality of stages of an imaging process using the camera.

In some embodiments, the plurality of stages of the imaging process includes: exposure of the image sensing unit array, scanning of the image sensing unit array, transmission of data captured by the image sensing unit array, image signal processing of data captured by the image sensing unit array.

In some embodiments, the load reduction module 820 includes: a data obtaining module configured to obtain data captured by the respective partial processing units; and a data combining module configured to combine data captured by at least two adjacent units in the partial processing units to generate combined data, wherein the combined data is used as an exposure result of the partial processing units for subsequent processing.

In some embodiments, the data combining module is further configured to determine the at least two adjacent units by: for each set of partial processing units of the at least one set of partial processing units, selecting, based on a positional relationship of the set of partial processing units relative to the set of full processing units, the number of adjacent units related to the positional relationship from the set of partial processing units.

In some embodiments, the load reduction module 820 includes: an exposure preventing module configured to prevent exposure of the at least some units, or a data discarding module configured to discard data captured by the at least some units.

In some embodiments, the exposure preventing module or the data discarding module is further configured to determine the at least some units by: for each set of partial processing units of the at least one set of partial processing units, selecting, based on a positional relationship of the set of partial processing units relative to the set of full processing units, a proportion of units related to the positional relationship from the set of partial processing units.

In some embodiments, the array dividing module 810 is further configured to: determine a relative position of the gazing point to the image sensing unit array based on an image of the user captured by a further camera; and divide the image sensing unit array into the set of full processing units and the at least one set of partial processing units based on the relative position and a characteristic of decay of an eyesight from the gazing point.

In some embodiments, the apparatus 800 further includes: a latency determination module configured to determine a time latency associated with obtaining the relative position; and a stage initiation module configured to initiate the at least one stage of the imaging process based on the time latency.

In some embodiments, the array dividing module 810 is further configured to: determine, based on a distortion characteristic of the lens, a first region with a distortion less than a threshold distortion and a second region with a distortion greater than the threshold distortion in the image sensing unit array; group units in the first region into the set of full processing units; and group units in the second region into the at least one set of partial processing units.

FIG. 9 illustrates a block diagram of a computing device 900 in which a plurality of embodiments of the present disclosure may be implemented. It should be understood that the computing device 900 shown in FIG. 9 is merely exemplary and should not constitute any limitation on the functionality and scope of the embodiments described herein. The computing device 900 shown in FIG. 9 may be used to implement a device including the imaging system 100 in FIG. 1. For example, the computing device 900 may be implemented as a VR, AR, or MR device.

As shown in FIG. 9, the electronic device 900 is in the form of a general computing device. The components of electronic device 900 may include, but are not limited to, one or more processors or processing units 910, a memory 920, a storage device 930, one or more communication units 940, one or more input devices 950, and one or more output devices 960. The processing unit 910 may be an actual or virtual processor and can execute various processes based on the programs stored in the memory 920. In a multiprocessor system, multiple processing units execute computer executable instructions in parallel to improve the parallel processing capability of the electronic device 900.

The electronic device 900 typically includes multiple computer storage medium. Such medium may be any available medium that is accessible to the electronic device 900, including but not limited to volatile and non-volatile medium, removable and non-removable medium. The memory 920 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 930 may be any removable or non-removable medium, and may include a machine readable medium such as a flash drive, a disk, or any other medium, which may be used to store information and/or data (such as training data for training) and may be accessed within the electronic device 900.

The electronic device 900 may further include additional removable/non-removable, volatile/non-volatile storage medium. Although not shown in FIG. 9, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 920 may include a computer program product 925, which has one or more program units configured to perform various methods or acts of various implementations of the present disclosure.

The communication unit 940 communicates with a further electronic device through the communication medium. In addition, functions of components in the electronic device 900 may be implemented by a single computing cluster or multiple computing machines, which can communicate through a communication connection. Therefore, the electronic device 900 may be operated in a networking environment using a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The electronic device 900 may also communicate with one or more external devices (not shown) through the communication unit 940 as required. The external device, such as a storage device, a display device, etc., communicate with one or more devices that enable users to interact with the electronic device 900, or communicate with any device (for example, a network card, a modem, etc.) that makes the electronic device 900 communicate with one or more other electronic devices. Such communication may be executed via an input/output (I/O) interface (not shown).

According to example implementation of the present disclosure, a computer-readable storage medium is provided, on which a computer-executable instruction or computer program is stored, wherein the computer-executable instructions is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be performed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

We claim:

1. A method of image processing, comprising:
dividing an image sensing unit array of a camera into a set of full processing units and at least one set of partial processing units based on at least one of:
a characteristic of a lens of the camera, or
a current gazing point of a user of the camera;
reducing a processing load associated with at least some units of the partial processing units within at least one stage of a plurality of stages of an imaging process using the camera;
determining a time latency associated with obtaining a relative position of the gazing point to the image sensing unit array; and
initiating the at least one stage of the imaging process based on the time latency.

2. The method of claim 1, wherein the plurality of stages of the imaging process comprise:
exposure of the image sensing unit array,
scanning of the image sensing unit array,
transmission of data captured by the image sensing unit array,
image signal processing of data captured by the image sensing unit array.

3. The method of claim 1, wherein reducing the processing load associated with at least some units of the partial processing units comprises:
obtaining data captured by the respective partial processing units; and
combining data captured by at least two adjacent units in the partial processing units to generate combined data, wherein the combined data is used as an exposure result of the partial processing units for subsequent processing.

4. The method of claim 3, wherein the at least two adjacent units are determined by:
for each set of partial processing units of the at least one set of partial processing units, selecting, based on a positional relationship of the set of partial processing units relative to the set of full processing units, the number of adjacent units related to the positional relationship from the set of partial processing units.

5. The method of claim 1, wherein reducing the processing load associated with at least some units of the partial processing units comprises:
preventing exposure of the at least some units, or
discarding data captured by the at least some units.

6. The method of claim 5, wherein the at least some units are determined by:
for each set of partial processing units of the at least one set of partial processing units, selecting, based on a positional relationship of the set of partial processing units relative to the set of full processing units, a proportion of units related to the positional relationship from the set of partial processing units.

7. The method of claim 1, wherein dividing the image sensing unit array of the camera into the set of full processing units and the at least one set of partial processing units comprises:
determining the relative position of the gazing point to the image sensing unit array based on an image of the user captured by a further camera; and
dividing the image sensing unit array into the set of full processing units and the at least one set of partial processing units based on the relative position and a characteristic of decay of an eyesight from the gazing point.

8. The method of claim 1, wherein dividing the image sensing unit array of the camera into the set of full processing units and the at least one set of partial processing units comprises:
determining, based on a distortion characteristic of the lens, a first region with a distortion less than a threshold distortion and a second region with a distortion greater than the threshold distortion in the image sensing unit array;
grouping units in the first region into the set of full processing units; and
grouping units in the second region into the at least one set of partial processing units.

9. An electronic device, comprising:
at least one processing unit; and at least one memory, coupled to the at least one processing unit and storing instructions for execution by the at least one processing unit, the instructions, when executed by the at least one processing unit, causing the electronic device to perform acts comprising:

dividing an image sensing unit array of a camera into a set of full processing units and at least one set of partial processing units based on at least one of:

a characteristic of a lens of the camera, or a current gazing point of a user of the camera; and reducing a processing load associated with at least some units of the partial processing units within at least one stage of a plurality of stages of an imaging process using the camera;

determining a time latency associated with obtaining a relative position of the gazing point to the image sensing unit array; and initiating the at least one stage of the imaging process based on the time latency.

10. The device of claim 9, wherein the plurality of stages of the imaging process comprise:

exposure of the image sensing unit array, scanning of the image sensing unit array, transmission of data captured by the image sensing unit array, image signal processing of data captured by the image sensing unit array.

11. The device of claim 9, wherein reducing the processing load associated with at least some units of the partial processing units comprises:

obtaining data captured by the respective partial processing units; and combining data captured by at least two adjacent units in the partial processing units to generate combined data, wherein the combined data is used as an exposure result of the partial processing units for subsequent processing.

12. The device of claim 11, wherein the at least two adjacent units are determined by:

for each set of partial processing units of the at least one set of partial processing units, selecting, based on a positional relationship of the set of partial processing units relative to the set of full processing units, the number of adjacent units related to the positional relationship from the set of partial processing units.

13. The device of claim 9, wherein reducing the processing load associated with at least some units of the partial processing units comprises:

preventing exposure of the at least some units, or discarding data captured by the at least some units.

14. The device of claim 13, wherein the at least some units are determined by:

for each set of partial processing units of the at least one set of partial processing units, selecting, based on a positional relationship of the set of partial processing units relative to the set of full processing units, a proportion of units related to the positional relationship from the set of partial processing units.

15. The device of claim 9, wherein dividing the image sensing unit array of the camera into the set of full processing units and the at least one set of partial processing units comprises:

determining the relative position of the gazing point to the image sensing unit array based on an image of the user captured by a further camera; and dividing the image sensing unit array into the set of full processing units and the at least one set of partial processing units based on the relative position and a characteristic of decay of an eyesight from the gazing point.

16. The device of claim 9, wherein dividing the image sensing unit array of the camera into the set of full processing units and the at least one set of partial processing units comprises:

determining, based on a distortion characteristic of the lens, a first region with a distortion less than a threshold distortion and a second region with a distortion greater than the threshold distortion in the image sensing unit array;

grouping units in the first region into the set of full processing units; and grouping units in the second region into the at least one set of partial processing units.

17. A non-transitory computer readable storage medium having stored thereon a computer program executable by a processor to implement acts comprising:

dividing an image sensing unit array of a camera into a set of full processing units and at least one set of partial processing units based on at least one of:

a characteristic of a lens of the camera, or a current gazing point of a user of the camera; and reducing a processing load associated with at least some units of the partial processing units within at least one stage of a plurality of stages of an imaging process using the camera;

determining a time latency associated with obtaining a relative position of the gazing point to the image sensing unit array; and initiating the at least one stage of the imaging process based on the time latency.

18. The medium of claim 17, wherein the plurality of stages of the imaging process comprise:

exposure of the image sensing unit array, scanning of the image sensing unit array, transmission of data captured by the image sensing unit array, image signal processing of data captured by the image sensing unit array.

* * * * *